(12) United States Patent
Fatica et al.

(10) Patent No.: US 11,559,949 B2
(45) Date of Patent: Jan. 24, 2023

(54) METHOD FOR CONNECTING TWO UNITARY ELEMENTS OF A CONDUIT FOR TRANSPORTING FLUIDS BY MEANS OF A SLEEVE

(71) Applicant: SAIPEM S.A., Montigny le Bretonneux (FR)

(72) Inventors: Giulio Fatica, Milan (IT); Taoufik Majdoub, Bobigny (FR)

(73) Assignee: SAIPEM S.A., Montigny le Bretonneux (FR)

( * ) Notice: Subject to any disclaimer, the term of this patent is extended or adjusted under 35 U.S.C. 154(b) by 630 days.

(21) Appl. No.: 16/303,581

(22) PCT Filed: Apr. 28, 2017

(86) PCT No.: PCT/FR2017/051009
§ 371 (c)(1),
(2) Date: Nov. 20, 2018

(87) PCT Pub. No.: WO2017/203114
PCT Pub. Date: Nov. 30, 2017

(65) Prior Publication Data
US 2020/0316876 A1    Oct. 8, 2020

(30) Foreign Application Priority Data

May 23, 2016 (FR) ..................................... 16 54584

(51) Int. Cl.
*B29C 65/00* (2006.01)
*F16L 47/03* (2006.01)
(Continued)

(52) U.S. Cl.
CPC ........ *B29C 66/72321* (2013.01); *F16L 47/03* (2013.01); *B29C 66/73921* (2013.01);
(Continued)

(58) Field of Classification Search
CPC ........ B29C 66/72321; B29C 66/73921; B29K 2995/0026; F16L 47/03; F16L 58/181
See application file for complete search history.

(56) References Cited

U.S. PATENT DOCUMENTS 6,156,144 A * 12/2000 Lueghamer ......... B29C 66/1122
156/156
2010/0266790 A1* 10/2010 Kusinski ................... B32B 5/26
428/34.6

(Continued)

FOREIGN PATENT DOCUMENTS

DE      196 52 712      2/1998
EP      0 075 901       4/1983
(Continued)

*Primary Examiner* — Daniel McNally
(74) *Attorney, Agent, or Firm* — Cozen O'Connor

(57) ABSTRACT

A method of connecting together two unit elements (4, 4') of a fluid transport pipe, each unit pipe element being covered in an outer insulating coating (6, 6') made of a thermoplastic material, with the exception of an end portion that does not have an outer insulating coating. The method includes: a step of welding together two abutting unit pipe elements; a step of positioning an annular sleeve (14) around a cut-back and in part around the outer insulating coatings of the two unit pipe elements, the sleeve being made of a thermoplastic material; a step of fastening the sleeve in sealed manner by weld bonding on the outer insulating coatings; and a step of applying an external pressure on the sleeve to enable it to be deformed elastically and match the shape of the respective end portions of the two unit pipe elements.

12 Claims, 2 Drawing Sheets

(51) Int. Cl.
B29K 23/00 (2006.01)
B29L 23/00 (2006.01)
F16L 58/18 (2006.01)

(52) U.S. Cl.
CPC .. *B29K 2023/12* (2013.01); *B29K 2995/0026* (2013.01); *B29L 2023/225* (2013.01); *F16L 58/181* (2013.01)

(56) References Cited

U.S. PATENT DOCUMENTS

| | | | | |
|---|---|---|---|---|
| 2011/0146903 | A1* | 6/2011 | Stauffer | B29C 66/81431 156/272.8 |
| 2012/0031878 | A1* | 2/2012 | Rukavina Mikusic | B29C 66/71 219/59.1 |
| 2014/0166359 | A1* | 6/2014 | Vallauri | H02G 15/1826 174/75 R |

FOREIGN PATENT DOCUMENTS

| | | | | |
|---|---|---|---|---|
| GB | 2165910 A | * | 4/1986 | B25B 27/28 |
| WO | WO 2010/121339 | | 10/2010 | |
| WO | WO2012/098528 | | 7/2012 | |

\* cited by examiner

METHOD FOR CONNECTING TWO UNITARY ELEMENTS OF A CONDUIT FOR TRANSPORTING FLUIDS BY MEANS OF A SLEEVE

PRIORITY CLAIM

This is a U.S. national stage of application No. PCT/FR2017/051009, filed on Apr. 28, 2017. Priority is claimed on France Application No. FR1654584, filed May 23, 2016, the content of which is incorporated here by reference.

BACKGROUND OF THE INVENTION

The present invention relates to the general field of fluid transport pipes, and in particular undersea pipes, resting on the sea bed or providing a bottom-to-surface connection for transferring hydrocarbons, e.g. oil and gas, coming from undersea production wells. The invention relates more particularly to connecting together two unit elements of such pipes.

These undersea pipes usually comprise a steel alloy tube that is covered in an outer insulating coating, typically a thermoplastic polymer, for limiting heat losses to the surrounding medium. The thickness of the outer coating varies depending on the operating conditions for the fluid that is to be transported (pipe length, fluid temperature, fluid composition, etc.).

In general, these pipes are assembled on land to form elements of unit length (referred to as double, triple, or quadruple joints, with the term "quad-joint", which literally means quadruple sections of tube, being used below for any such unit length). These quad-joints are then transported at sea on a laying ship.

During laying, the quad-joints are connected to one another on board the ship progressively while they are being laid at sea. Laying may be performed using a J-lay or an S-lay tower positioned on the laying ship. With J-laying, the undersea pipe is typically lowered from the laying ship almost vertically (in the range +30° to −10° relative to the vertical). J-laying is simple catenary laying in which the almost vertical angle of inclination of the pipe diminishes progressively as it moves downwards until it matches the slope of the sea bottom. With S-laying, the undersea pipe is typically lowered from the laying ship almost horizontally and it curves subsequently in order to reach the sea bottom.

The J-lay and S-lay techniques require each new quad-joint to be connected on board the laying ship to the undersea pipe prior to being lowered into the sea by moving the laying ship. This step of connecting a new quad-joint to the undersea pipe is performed by butt-welding the free ends made of steel of the respective tubes of the new quad-joint and of the undersea pipe. Connecting together the new quad-joint and the insulated undersea pipe is made possible by a preliminary operation that is performed after the quad-joints have been coated in the factory, this operation consisting in removing the insulating coating at the ends over a defined length that enables welding and non-destructive inspection equipment to be deployed.

Once the ends have been welded together, it is necessary to use a new insulating coating to cover the zone of the pipe that includes the weld together with the portions of the tube of the pipe from which the outer insulating coating has been removed (which zone is referred to as the "cut-back"), and to do so while ensuring that this covering is put into place in a manner that is properly sealed to the remainder of the outer insulating coating of the pipe. For this purpose, the cut-back may be covered in several successive layers of different polymer materials. For example, after preparing the exposed steel surface by shot blasting, a relatively thin first layer forming a corrosion protection primary is applied directly to the cut-back, a thicker second layer of a polymer-based adhesive is applied on the adhesion primary, and a relatively thick third layer is applied on the adhesive out to at least the thickness of the coating that is already applied on the pipe. Alternatively, after depositing an adhesion primary on the cut-back, it is possible to apply the insulating material by injection molding.

That method of applying the outer insulating coating over the cut-back is referred to as "field joint coating". Reference may be made to Document WO 2012/098528, which describes an example of such an application technique.

Nevertheless, that field joint coating technique presents a certain number of drawbacks. In particular, the time it takes is relatively long, and is thus constraining (typically of the order of 20 minutes (min) to 30 min per operation). When it involves injection molding of the material, that technique presents a problem of ensuring the molding adheres to the cut-back on the pipe, specifically the durability of the system depends on the success with which the molded joint adheres on the existing coating. Finally, it is an application technique that provides little flexibility.

OBJECT AND SUMMARY OF THE INVENTION

A main object of the present invention is thus to propose a method of connection that does not present the above-mentioned drawbacks of field joint coating.

In accordance with the invention, this object is achieved by a method of connecting together two unit elements of a fluid transport pipe, each unit pipe element being made of metal alloy and being covered in an outer insulating coating made of a thermoplastic material, with the exception of an end portion that does not have an outer insulating coating, the method comprising:

a step of welding together two unit pipe elements abutting at their end portions not having any outer insulating coating so as to form an annular cut-back;

a step of positioning an annular sleeve around the cut-back and in part around the outer insulating coatings of the two unit pipe elements, the sleeve being made of a thermoplastic material; and a step of fastening the sleeve in sealed manner by weld bonding on the outer insulating coatings of the two unit pipe elements.

The method of the invention is remarkable in that it uses a sleeve that is slid over the cut-back in order to cover it and that is fastened to the coating in sealed manner by weld bonding. The sleeve, which is made of a thermoplastic material, serves to guarantee continuity of the coatings over the connection zone between the two unit pipe elements, i.e. to guarantee sealing. Furthermore, the time required for weld bonding the sleeve is very short, of the order of about 3 min, which represents a significant saving of time compared with the prior art field joint coating technique. Furthermore, by having recourse to weld bonding, fastening the sleeve does not present any problems of adhesion on the unit pipe elements. Finally, the method is applicable to any thermoplastic material used for making the outer insulating coating and to unit pipe elements of any dimension.

After the step of fastening the sleeve in sealed manner, the method may further comprise a step of injecting an insulating material inside an annular cavity defined on the inside by the cut-back and on the outside by the sleeve. When the outer insulating coating presents relatively large thickness, e.g. at least about 10 millimeters (mm), this insulating material thus serves to provide thermal insulation for the unit pipe elements where they are connected together, and to transmit pressure forces applied to the sleeve towards the unit pipe elements (compression forces from external pressure).

Under such circumstances, the insulating material when hot is preferably in the form of a gel or a liquid that is suitable for solidifying inside the cavity on cooling.

The step of fastening the sleeve in sealed manner on the outer insulating coatings of the two unit pipe elements may be performed by laser-bonded coating.

Under such circumstances, the material constituting the sleeve may be transparent or translucent at the laser wavelength in order to allow the laser to pass through the sleeve to the surfaces to be bonded together, the laser-bonded coating of the sleeve optionally including positioning films of material that is absorbent at the laser wavelength between the contacting surfaces of the sleeve and of the outer insulating coatings of the two unit pipe elements.

Alternatively, the step of fastening the sleeve in sealed manner on the outer insulating coatings of the two unit pipe elements may be performed by fusion-bonded coating.

Under such circumstances, the sleeve may include at least one electrical resistance at an internal surface that, during the step of positioning the sleeve, is put into contact with the portions of the outer insulating coatings of the unit pipe elements that are covered by said sleeve and that is connected to a source of electricity in order to cause the surface of the material constituting the sleeve to melt so as to provide sealed fastening of the sleeve on the outer insulating coatings of the unit pipe elements.

The step of positioning the sleeve may include sliding the sleeve along one of the unit pipe elements.

BRIEF DESCRIPTION OF THE DRAWINGS

Other characteristics and advantages of the present invention appear from the following description made with reference to the accompanying drawings, which show embodiments having no limiting character. In the figures.

DETAILED DESCRIPTION OF THE INVENTION

The invention applies to connecting together two unit elements of a pipe, in particular an undersea pipe, for transporting fluids such as hydrocarbons, e.g. oil and gas coming from undersea production wells.

A field of application of the invention is that single-pipe type undersea pipes, as contrasted to coaxial pipes known as "pipe-in-pipe" or "PIP".

FIGS. 1 to 5 show an application of the invention to connecting together respective tubes 2 and 2' of two unit elements 4 and 4' (referred to below as "quad-joints") of such an undersea pipe.

In known manner, the respective tubes 2, 2' of these quad-joints are made of steel alloy and they are covered in respective outer insulating coatings referenced 6 and 6', for limiting the loss of heat to the surrounding medium. Typically the outer insulating coating is constituted by a thermoplastic polymer, e.g. polypropylene, and it may be made up of various different layers of constitutions that may vary depending on operating conditions. By way of example, use may be made of a composition for an outer insulating coating that is made up of inner layers of polypropylene that is foamed or filled with hollow glass microspheres (referred to as "syntactic foam") together with outer layers of pure polypropylene.

While the undersea pipe is being laid at sea, the quad-joints are connected to one another on board the laying ship progressively as they are laid at sea (where the laying may be of the J-lay or of the S-lay type). These laying techniques require each new quad-joint to be connected on board the laying ship to the quad-joint that has been most recently assembled to the undersea pipe prior to lowering it into the sea by moving the laying ship.

Figure 1:
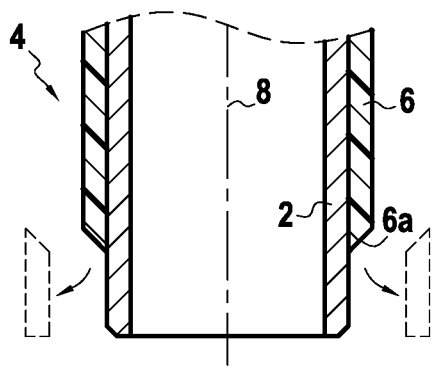
FIGS. 1 to 5 show various different steps of a method of connecting together two unit undersea pipe elements in an implementation of the invention.

To this end, and as shown in FIG. 1, it is necessary initially to remove the outer insulating coatings 6 and 6' from end portions of the tubes 2 and 2' of the new quad-joint 4 for assembling and of the most recently assembled quad-joint 4' of the undersea pipe.

By way of example, this step is performed using various different mechanical techniques for machining the outer insulating coatings 6, 6'. This cutting away may lead to various cut shapes for the respective ends 6a and 6'a of the outer insulating coatings 6 and 6'. Thus, as can be seen more clearly in FIG. 4, these ends 6a and 6'a may be cut to have the shape of truncated cones. Alternatively, these ends may be given other shapes, such as for example a straight shape, a staircase shape, etc.

Figure 2:
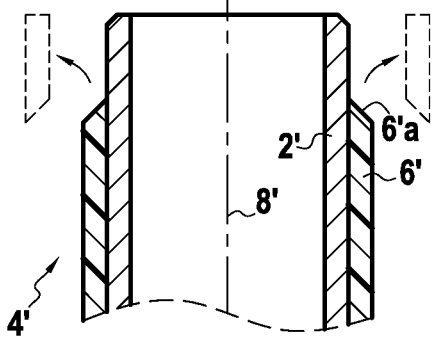
Figure 2:
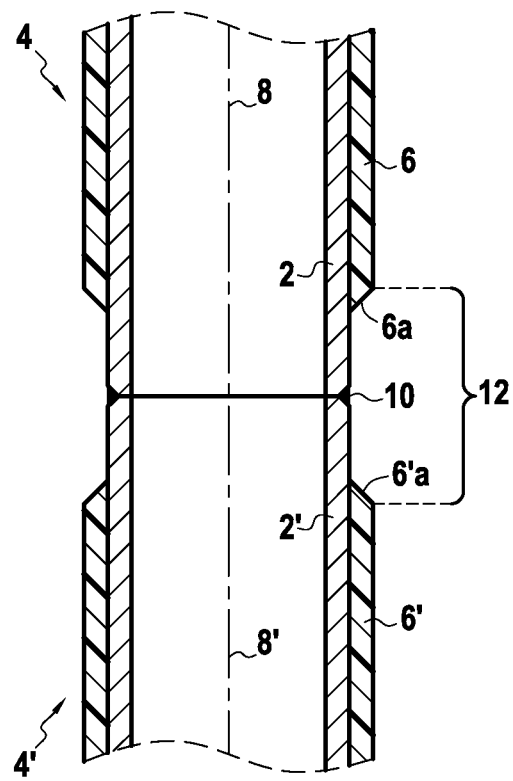

The following step of the connection method consists in aligning the longitudinal axis 8 of the new quad-joint 4 that is to be assembled with the longitudinal axis 8' of the most recently assembled quad-joint 4' of the undersea pipe and in moving these quad-joints towards each other so as to put the free ends of their respective tubes 2, 2' into contact with each other (FIG. 2).

These steel tubes 2, 2' are then welded together at their free ends so as to form an annular weld bead 10 between the tubes. This welding may be performed in one or more passes by any conventional welding technique, in particular by passing via the outside or via the inside of the quad-joints.

The tubes 2 and 2' welded together in this way form an annular cut-back zone 12 where the insulating coating has been removed, which zone is defined longitudinally between respective ends 6a and 6'a of the outer insulating coatings 6 and 6'.

Once the tubes 2 and 2' have been welded together, the connection method of the invention provides for positioning an annular sleeve 14 around the cut-back 12, this sleeve 14 presenting an inside diameter that is slightly greater than the outside diameter of the quad-joints 4, 4' when covered in their outer insulating coatings 6, 6' so as to enable it to be slid therealong, and it is of a length that is longer than the length of the cut-back so as to cover parts of the outer insulating coatings of both unit pipe elements.

Prior to positioning the sleeve 14, the annular surface of the cut-back 12 may have been treated, e.g. by performing surface treatment that consists in shot blasting the exposed steel surface followed by applying a thin polymer coating so as to perform an anti-corrosion barrier function, which coating may be applied in liquid form by transfer using a contact tool, or by spraying, or it may be in powder form, or indeed it may be in the form of a heat-shrink sleeve. For mechanical reasons specific to the installation and operating characteristics of the pipeline, the weld bead may also be treated by performing treatment to remove the slag resulting from the welding operation (by grinding) in order to obtain a surface that is perfectly smooth.

The sleeve 14 is made of a thermoplastic material that may be the same as the material used for making the outer insulating coatings 6, 6' of the quad-joints.

Once the sleeve has been put into position, it is fastened in sealed manner on the outer insulating coating using a method as described below.

Figure 5:
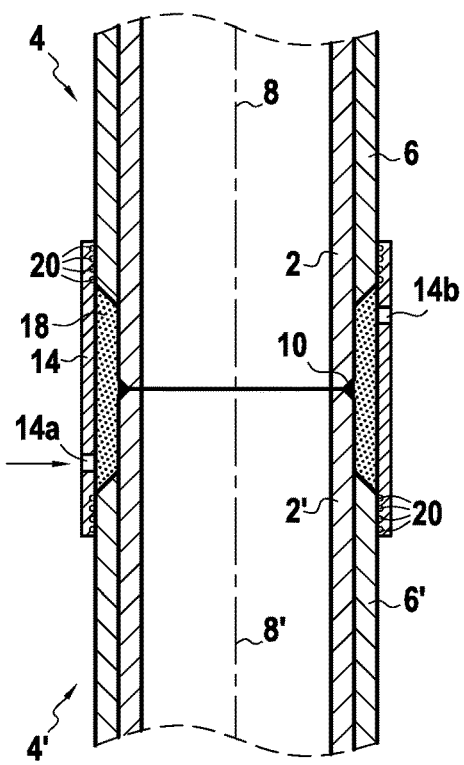
Figure 6A:
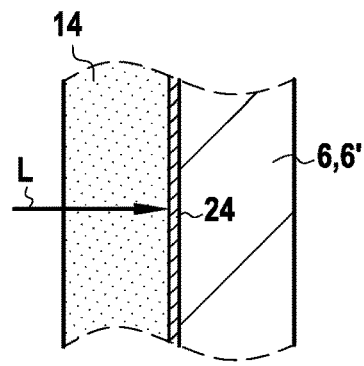
FIGS. 6A and 6B show a variant implementation of the sealed fastening of the sleeve using the laser-bonded coating technique.
Figure 6B:
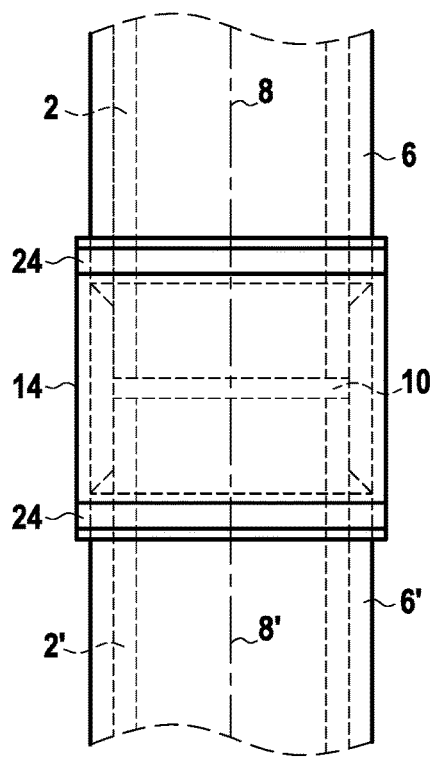

This step of sealed fastening may be performed by fusion-bonded coating (FIGS. 1 to 5) or by laser-bonded coating (FIGS. 6A and 6B).

Fusion-bonded coating consists in bonding the sleeve 14 directly on the outer insulating coatings 6 and 6' by means of a plurality of electrical resistances 20 integrated in the sleeve during its fabrication, the sleeve being made of a thermoplastic material that is thermochemically compatible with the thermoplastic material of the outer insulating coatings of the quad-joints.

Figure 3:
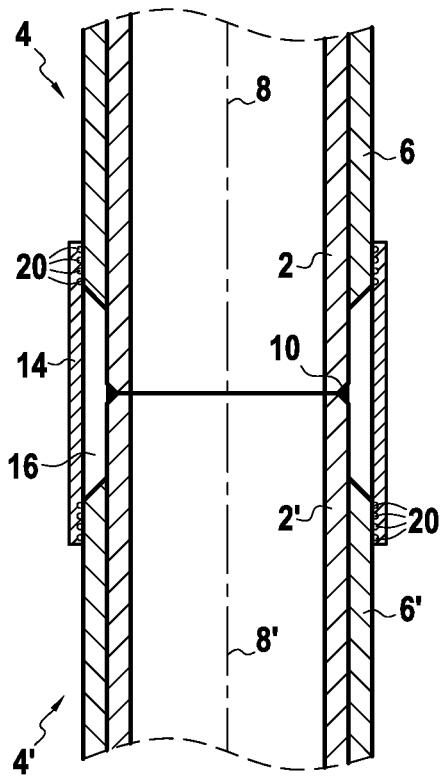
Figure 4:
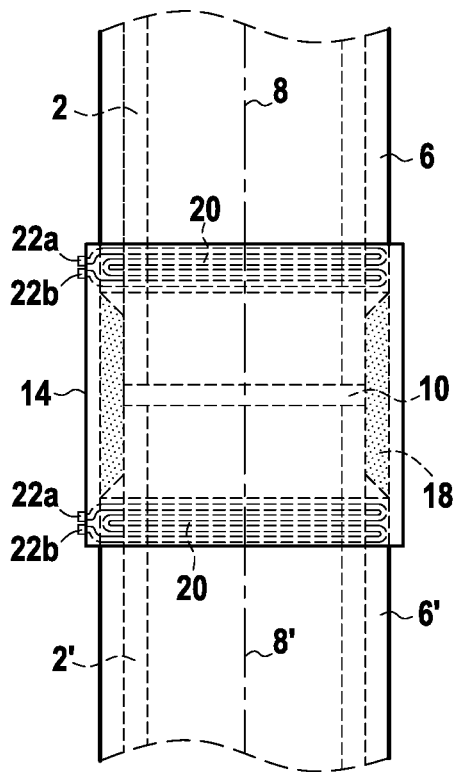

Thus, as shown in FIGS. 3 to 5, the sleeve 14 incorporates on its inside surface at each of its two longitudinal ends a respective electrical resistance 20, this electrical resistance coming into contact with the portions of the outer insulating coatings 6 and 6' of the quad-joints that are covered by said sleeve.

During the bonding step proper, these electrical resistances 20 are connected by pairs of connectors 22a, 22b to a source of electricity (not shown in the Figures) so as to give rise to surface melting of the material constituting the sleeve, suitable for fastening the sleeve in sealed manner on the outer insulating coatings of the two tubes of the quad-joints. More precisely, the Joule effect dissipation of the electrical power delivered to the electrical resistances has the effect of causing the material constituting the sleeve to melt at the surface. The intimate mixing of the material of the sleeve with the material of the outer insulating coatings of the tubes serves to provide perfect cohesion and sealing between the sleeve and those outer insulating coatings.

As shown in FIGS. 6A and 6B, the step of fastening the sleeve in sealed manner may alternatively be performed by laser-bonded coating.

Specifically, as shown diagrammatically in FIG. 6A, the material constituting the sleeve 14 is transparent (or translucent) at the wavelength of the laser used for bonding, and films 24 of material that is absorbent at the wavelength of the laser used is positioned at the ends of the outer insulating coatings 6 and 6' that are covered by the sleeve if the outer insulating coatings themselves are less absorbent than the sleeve. When the outer insulating coatings are made of a material that is more absorbent than the material of the sleeve, such films are not necessary.

As a result, during the step of fastening the sleeve in sealed manner, a laser beam L is directed towards the absorbent material (the outer insulating coating or the films 24, if necessary). The laser transparent nature of the sleeve enables the laser beam to pass through it in its thickness direction so as to reach the material that absorbs at the wavelength of the laser beam L (outer insulating coating or film). Since this material is absorbent, the electromagnetic energy of the laser beam is converted into heat, causing the surface of the material constituting the sleeve to melt. Intimate mixing of the material of the sleeve with the material constituting the outer insulating coatings 6 and 6' (at their ends where they are covered by the sleeve) thus serves to ensure perfect cohesion and sealing between the sleeve and these outer insulating coatings.

It should be observed that the laser L may be applied against the sleeve from outside the pipe, e.g. by means of a laser that is directed towards the surfaces for bonding together and that is suitable for pivoting about the longitudinal axis of the pipe.

Once the sleeve has been fastened in sealed manner on the outer insulating coating, it defines the outside of an annular cavity 16 that is defined on the inside by the cut-back 12.

In the implementation of the FIGS. 1 to 6, provision is then made to inject an insulating material 18 into the inside of this cavity 16, which material is in liquid or gel form when hot and is suitable for solidifying inside the cavity on cooling. By way of example, the material could be polyurethane in solid or foamed form or it could be a polyurethane-based gel and an organic compound of the kerosene type, for example.

To do this, the sleeve 14 is pierced by a first orifice 14a in order to inject the insulating material 18 and by a second orifice 14b in order to put the cavity 16 to ambient pressure (FIG. 5). Typically, it is possible to use an injection tool that is positioned around the sleeve and that enables the insulating material to be injected while applying a pressure on the sleeve during injection in order to oppose the pressure due to the injection (which also has the advantage of facilitating bonding).

These orifices 14a and 14b could be made while fabricating the sleeve, and their locations therein may depend in particular on the (vertical or horizontal) position of the quad-joints 4 and 4' while they are being connected together.

Once the insulating material 18 has been injected into the cavity 16, the method makes provision for closing in sealed manner the orifices 14a and 14b in the sleeve that were used for the injection. This step may be performed using patches or plugs (e.g. made of plastics material) that are positioned in sealed manner at the orifices 14a and 14b.

Figure 7:
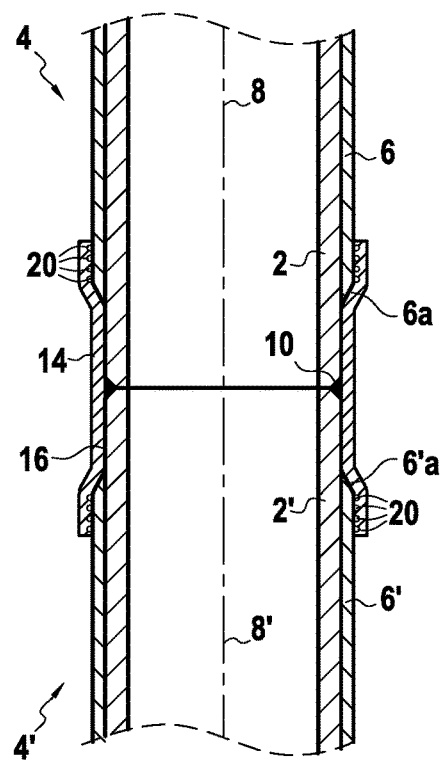
FIG. 7 shows another implementation of the invention in which no insulating material is injected inside the cut-back.

With reference to FIG. 7, there follows a description of another implementation of the invention. This implementation applies more particularly to outer insulating coatings of small thickness e.g. less than about 10 mm. It makes provision likewise for positioning a sleeve 14 around the cut-back 12 so as to cover parts of the outer insulating coatings 6 and 6' at their ends 6a, 6'a. Once in position, the sleeve 14 is fastened in sealed manner onto the outer insulating coatings by fusion-bonded coating (using one or more electrical resistances 20 as shown in FIG. 7) or by laser-bonded coating (embodiment not shown), as described above.

Compared with the above-described embodiment, given the small thickness of the outer insulating coatings, no provision is made to inject insulating material into the inside of the annular cavity 16 defined between the sleeve 14 and the cut-back.

Since the thickness of the cavity 16 is small, and since the ends 6a and 6'a of the outer insulating coatings 6 and 6' advantageously slope gently, the sleeve 14 responds to the effect of external pressure lying in the range 1 bar to 2 bars being applied by deforming plastically and fitting closely to the shape of the quad-joints without running the risk of tearing. The application of this external pressure is preferably exerted by means of an appropriate tool before or during the step of fastening the sleeve in sealed manner by weld bonding, or after the step of fastening the sleeve in sealed manner by weld bonding by hydrostatic pressure.

The invention claimed is:

1. A method of connecting together two unit elements of a fluid transport pipe, each unit pipe element being made of metal alloy and being covered in an outer insulating coating made of a thermoplastic material, with the exception of an end portion that does not have an outer insulating coating, the method comprising:
   a step of welding together two unit pipe elements abutting at their end portions not having any outer insulating coating so as to form an annular cut-back;
   a step of applying an anti-corrosive barrier to a surface of the annular cut-back;
   a step of, after applying the anti-corrosive barrier, positioning an annular sleeve around the cut-back and the anti-corrosive barrier, and in part around the outer insulating coatings of the two unit pipe elements, the annular sleeve being made of a thermoplastic material;
   a step of fastening the annular sleeve in sealed manner by weld bonding on the outer insulating coatings of the two unit pipe elements; and
   a step of applying an external pressure on the annular sleeve to enable it to be deformed plastically and match the shape of the respective end portions of the two unit pipe elements;
wherein the step of positioning the annular sleeve includes sliding the annular sleeve along one of the unit pipe elements.

2. The method according to claim 1, wherein the step of fastening the annular sleeve in sealed manner on the outer insulating coatings of the two unit pipe elements is performed by laser-bonded coating using a laser.

3. The method according to claim 2, wherein the thermoplastic material constituting the annular sleeve is transparent or translucent at a laser wavelength of a magnitude sufficient to allow the laser beam produced by the laser at such wavelength to pass through the annular sleeve to surfaces to be bonded together, the laser-bonded coating of the annular sleeve optionally including positioning films of material that is absorbent at the laser wavelength between the contacting surfaces of the annular sleeve and of the outer insulating coatings of the two unit pipe elements.

4. The method according to claim 2, wherein the external pressure applied on the annular sleeve lies in the range 1 bar to 2 bars.

5. The method according to claim 2, wherein the external pressure is applied on the annular sleeve before, during, and after the step of fastening the annular sleeve in sealed manner by weld bonding.

6. The method according to claim 1, wherein the step of fastening the annular sleeve in sealed manner on the outer insulating coatings of the two unit pipe elements is performed by fusion-bonded coating.

7. The method according to claim 6, wherein the annular sleeve includes at least one electrical resistance at an internal surface that, during the step of positioning the annular sleeve, is put into contact with the portions of the outer insulating coatings of the unit pipe elements that are covered by said annular sleeve and that is connected to a source of electricity in order to cause the surface of the material constituting the annular sleeve to melt so as to provide sealed fastening of the annular sleeve on the outer insulating coatings of the unit pipe elements.

8. The method according to claim 6, wherein the external pressure applied on the annular sleeve lies in the range 1 bar to 2 bars.

9. The method according to claim 6, wherein the external pressure is applied on the annular sleeve before, during, and after the step of fastening the annular sleeve in sealed manner by weld bonding.

10. The method according to claim 1, wherein the external pressure applied on the annular sleeve lies in the range 1 bar to 2 bars.

11. The method according to claim 1, wherein the external pressure is applied on the annular sleeve before, during, and after the step of fastening the annular sleeve in sealed manner by weld bonding.

12. The method according to claim 1, wherein the anti-corrosive barrier is a polymer coating:
   in liquid form,
   in powder form, or
   as a heat-shrinkable anti-corrosive sleeve.

* * * * *